March 29, 1966 C. LAKE 3,243,334
THERMOSEALING DEVICE
Filed March 1, 1963 2 Sheets-Sheet 1
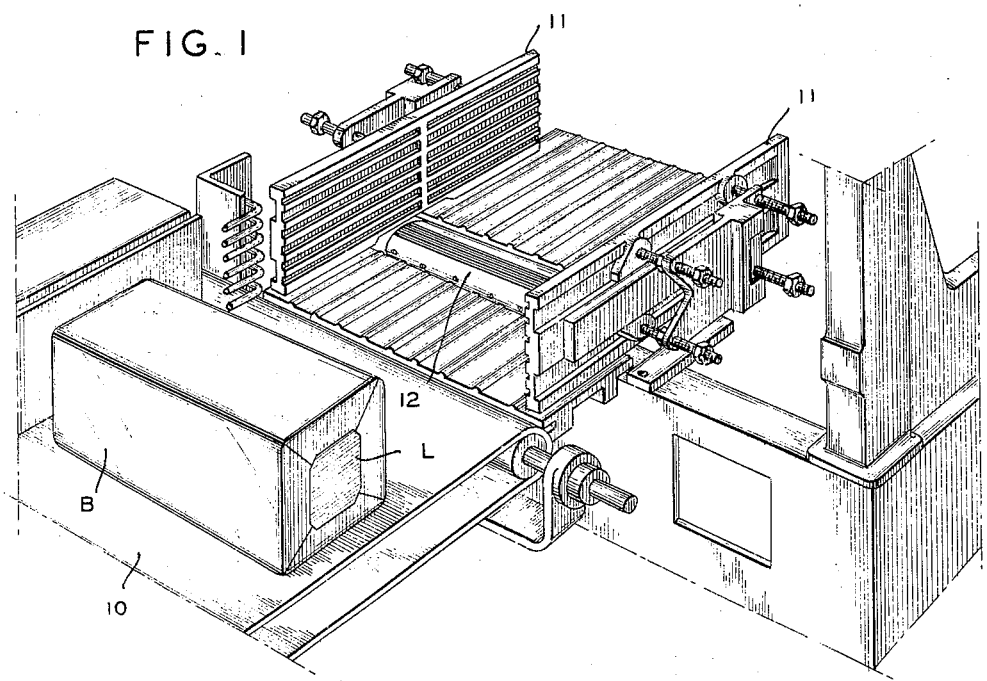
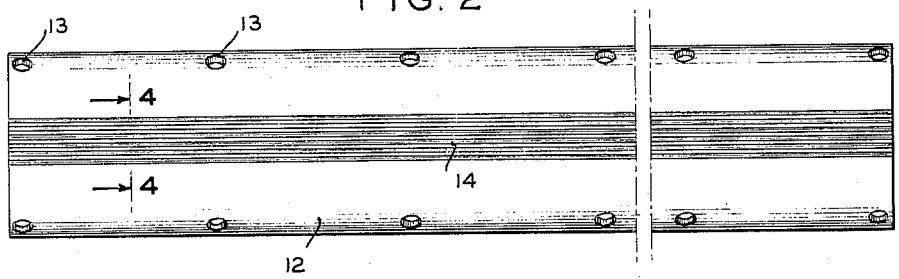
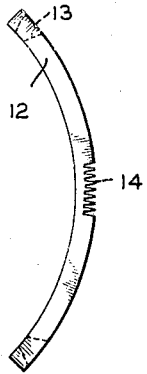
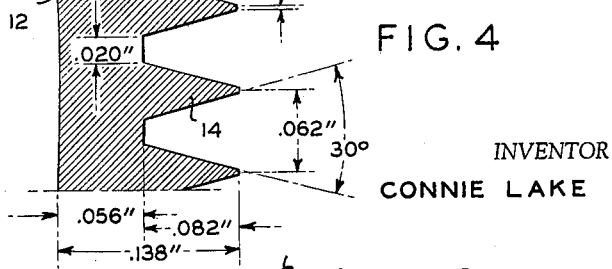
INVENTOR
CONNIE LAKE
BY E. Janet Berry
ATTORNEY March 29, 1966     C. LAKE     3,243,334
THERMOSEALING DEVICE
Filed March 1, 1963     2 Sheets-Sheet 2
FIG. 5
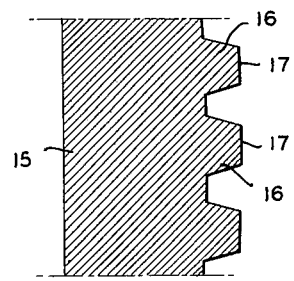
FIG. 6
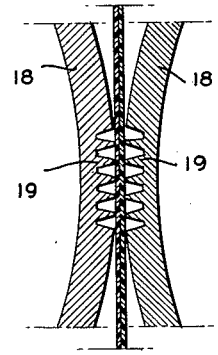
FIG. 7
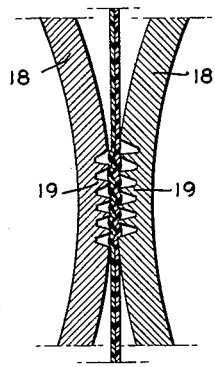
FIG. 9
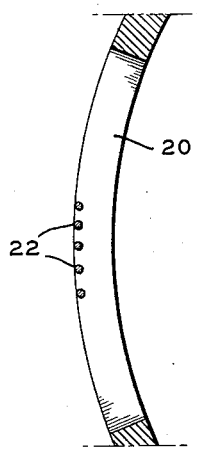
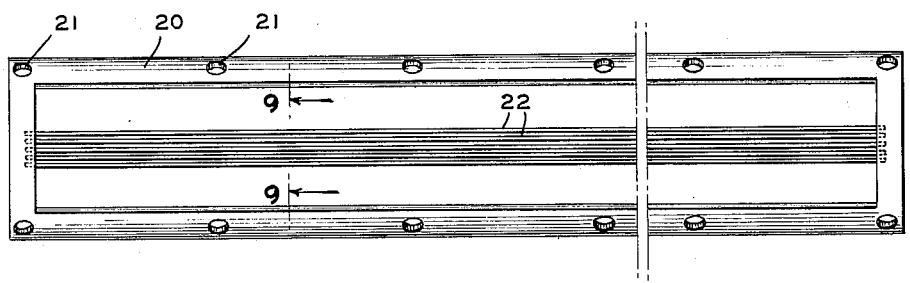
FIG. 8
INVENTOR
CONNIE LAKE
BY E. Janet Berry
ATTORNEY

3,243,334
THERMOSEALING DEVICE
Connie Lake, Pittsford, N.Y., assignor to National Distillers and Chemical Corporation, New York, N.Y., a corporation of Virginia
Filed Mar. 1, 1963, Ser. No. 262,101
5 Claims. (Cl. 156—583)

This invention relates generally to the sealing of thermoplastic films and to novel sealing devices therefor whereby particularly effective seals may be produced through two or more layers of such films.

The invention is especially directed to the sealing of thermoplastic films including polyolefins, specifically oriented and non-oriented films, including polystyrenes, polyesters, polyvinyl chlorides, and the like, and is concerned particularly with the sealing of polyethylene and polypropylene films.

It is well known in the prior art to produce satisfactory seals in thermoplastic films through the application of heat under carefully controlled conditions, with and without utilization of pressure. In this manner, seals may be produced in such films as polyethylene without unusual difficulty, although shrinkage and distortion may result. Suitable precautions must be exercised, as to temperature, pressure and dwell time, and, in addition, it is necessary that the film be protected from direct contact with the heating element of the sealer through utilization of a suitable cover such as "Teflon" impregnated glass cloth or the like.

With respect to biaxially oriented polypropylene films, it has been unknown to seal one layer thereof to another except where the sealer is externally covered and even under such conditions normal sealing practices are ineffective since application of heat results in random disorientation of the molecules, causing excessive shrinking and tearing of film. Efforts to overcome these problems through the use of a coating applied to the film, or by the employment of heat moderating coverings on the sealing surface, have met only with partial success.

Further, it is unknown in the prior art to effectively seal an oriented polypropylene film to a non-oriented polypropylene film, or to effectively seal non-oriented polypropylene to polyethylene.

It is a major purpose of the present invention to provide a novel sealing device whereby effective seals may be produced in thermoplastic films without any necessity for the utilization of covering materials to prevent contact of the sealing element with the film per se or applying a coating of any kind to the film itself.

It is a further object of the present invention to provide a novel sealing device whereby packages may be effectively sealed in thermoplastic films whether molecularly oriented or otherwise, without the necessity for any application of positive pressure upon the film surface being sealed, the weight of the package or the guiding pressures exerted during a continuous or semi-continuous process as the article is advanced through automatic sealing apparatus being sufficient to provide surface contact between layers of film and insuring the effective sealing thereof.

It is a still further object of the present invention to effect a seal in one direction across a limited area of thermoplastic film, said area consisting of two layers of film and a single layer thereof without injury to the single layers, including excessive shrinkage, burning through, or the like.

It is a further object of the invention to provide a novel sealing device whereby effective seals may be created in oriented polypropylene films, the degree of shrinkage occurring being maintained at an acceptable level.

It is a still further object of the present invention to provide a novel sealing device for producing effective and continuous seals in one direction in polyolefin films, said seals having superior resistance to moisture penetration.

It is a further object of the invention to provide a novel sealing device for the effective sealing of oriented to non-oriented polypropylene and non-oriented polypropylene to polyethylene.

It is a still further object of the present invention to provide a novel sealing device for producing effective seals in polyethylene and polypropylene films utilizing bare metal as the conductor of heat, with and without pressure, without any necessity for the utilization of coatings or heat moderating coverings on the sealing surfaces.

Further objects and advantages of the invention will be readily apparent from the following description, taken in conjunction with the accompanying drawings, wherein:

FIGURE 1 is a fragmentary perspective view illustrating, somewhat diagrammatically, wrapping and sealing apparatus including a sealing device embodying the present invention;

FIGURE 2 is a top plan view of the sealing element detached;

FIGURE 3 is an end elevational view of the sealing element of FIGURE 2;

FIGURE 4 is a fragmentary transverse sectional view, on an enlarged scale, taken on the line 4—4 of FIGURE 2;

FIGURE 5 is a fragmentary transverse sectional view, on an enlarged scale and similar to FIGURE 4, of a modified form of the invention;

FIGURE 6 is a fragmentary sectional view of a pair of mating sealers, constructed in accordance with the present invention, disposed for the sealing therebetween of two or more layers of thermoplastic film;

FIGURE 7 is a fragmentary sectional view, similar to FIGURE 6, and illustrating the mating sealers disposed in offset or staggered relationship;

FIGURE 8 is a top plan view, similar to FIGURE 2, illustrating a further modified sealing device embodying the present inventive concept; and FIGURE 9 is a transverse sectional view taken on the line 9—9 of FIGURE 8.

Prior art practices have long undertaken the sealing of thermoplastic films through application of heat and pressure, sealing being accomplished more or less continuously over the entire area where two or more layers of film were to be united. Various sealing devices, both manual and automatic, have been employed for such purposes and these have included heated sealing surfaces of substantial extent which were applied to the film areas to be united. More particularly, the sealing of uncoated biaxially oriented polypropylene film to obtain an effective seal without resorting to special coatings or adhesives has been recognized as a problem in the packaging industry and attempts to seal such films generally have resulted in excessive shrinkage and tearing of the film. Further, greatly aggravated problems arise in connection with the sealing of oriented to non-oriented polypropylene films as well as in connection with the sealing of polyethylene to polypropylene.

Applicant now has discovered that continuous or extensive sealing surfaces are not required for such purposes. On the contrary, sealing elements which provide a plurality of closely spaced parallel lines or ridges and relatively narrow sealing surfaces may be employed to produce highly efficient seals, this multiline sealing concept and end result being entirely novel. It is contemplated that the method of sealing described herein, the seals produced thereby, the packages produced by use of one or more of such seals, as well as the sealing devices per se, are all novel and inventive.

Several illustrative sealers and sealing surfaces have been shown in the drawings, and will be described hereafter, suitable for both manual and automatic operation.

One field of particular commercial importance may be found in the wrapping of articles and merchandise such as loaves of bread, sliced or otherwise where, specifically, a longitudinal or bottom seal, as well as end seals, is required and for a commercially acceptable package it is of prime importance that the end seals be readily peelable so that repeated access may be had to package contents for the removal of a portion thereof with the wrapper remaining substantially intact, particular reference being had to the bottom seal, and the contents protected against undue drying out and other unwanted effects resulting from exposure to air.

As a specific embodiment, a wrapping machine for such purposes has been illustrated in FIGURE 1 of the drawings and includes a guideway 10 through which loaves of bread B, which have been wrapped in thermoplastic sheet material, and have had end labels L initially affixed thereto, are advanced continuously to the sealing stage.

Such apparatus is well known, requiring no particular discussion here, and includes appropriate folding mechanism which completes the envelopment of the bread within the wrapper whereupon end labels are initially applied to the packaged loaf, it being understood that the longitudinal edges of the wrapper overlie each other beneath the loaf of bread.

As the wrapping of each loaf of bread is thus completed, the package is advanced between vertically disposed end sealers 11 which may be of appropriate construction and design whereby an effective but readily peelable seal is created between the end labels L and the underlying thermoplastic sheet wrapping material. The sealing surfaces of the vertically disposed end sealers are heated to an appropriate sealing temperature, dependent upon the thermoplastic material employed and as is well known in this art, and no particular extra pressure other than that of the package itself, or dwell time, is required to perform the end sealing operation, it being sufficient that the end sealers have contact and frictional engagement with the wrapped ends of the loaves of bread as these pass through the guideway 10.

As each loaf of bread travels through the wrapping machine, it passes over the bottom sealing element 12 which, in a preferred embodiment thereof, is provided with a multi-line heated sealing surface as illustrated more particularly in FIGURES 2, 3 and 4 of the drawings.

Desirably, the bottom sealing element is in the form of a convex plate, to conform to the somewhat hollow or concave bottom of the bread loaf, and the usual push-on-stop-push-off technique is employed for regulation of dwell time in accordance with the nature of the film employed and the temperature of the bottom sealing bar.

As illustrated, the plate 12 is generally rectangular, having a convex cross-sectional configuration, and is provided with a plurality of apertures 13 for reception of appropriate fastening elements, such as screws or the like, for attachment to a suitable base or supporting structure, not shown. This base may be recessed in its upper surface for the accommodation of appropriate heating elements, desirably having thermostatic control, so that the temperature of the plate or cap 12 may be selectively elevated to sealing range and retained constant at the required or desired temperature.

The precise design or configuration of the sealing surface of the cap 12 is of importance to the present inventive concept and comprises a plurality of parallel spaced lines or ridges 14 which extend longitudinally of the sealing element and are of sufficient length to cover the entire area to be sealed. A preferred spacing of these ridges is approximately 1/16″ from the center of one ridge to the center of the next and these ridges may have a sharp surface along the tops thereof or may be flattened slightly, a typical flat surface being approximately .005 to .032 inch in width.

While these dimensions have been found, in practice, to produce particularly effective results, other combinations of ridges with curved, sharp or flattened surfaces also function efficiently In the preferred embodiment of the invention, and as shown in greater detail in FIGURE 4 of the drawings, each ridge 14 is .082″ in height and the spacing between adjacent ridges is .062.″ Each ridge is provided with a flattened top having a width of .005″ and the side walls of adjacent ridges taper toward each other at an inclined angle of 30°, a flattened space .020″ wide being provided at the base of each ridge. The thickness of the cap is .138″, including the ridged surface, and these dimensions permit of the rapid heating of the cap with the ridges attaining sealing temperature without any material delay occasioned by reason of any substantial metallic mass in the base portion.

As illustrated in FIGURE 5 of the drawings, the inventive concept is applicable to flat bar type sealers, for use with heavier gauge thermoplastic materials, and the sealing element 15 includes spaced and parallel ridges 16 having flattened upper surfaces 17 of substantial width.

Further, as illustrated in FIGURES 6 and 7 of the drawings, where it is desired to seal on opposite sides of superimposed layers of thermoplastic films, opposed jaws, bars or rolls 18 having ridged surfaces 19, similar to the surfaces 14 discussed hereabove, are provided. These opposed ridged surfaces may be disposed in mating or directly opposed relationship, as shown in FIGURE 6, or may be staggered as shown in FIGURE 7 to provide a corrugated type seal with alternate high and low spots.

A modified form of the invention has been illustrated in FIGURES 9 and 10 of the drawings where the heating element or cap 20 is in the form of a rectangular frame, provided with a plurality of apertures 21 for the reception of suitable fastening elements, such as screws or the like, for attachment to an appropriate base or other supporting structure, not shown. A spaced series of parallel wires 22 are provided, located substantially flush with the upper surface of the sealing element. These wires, which serve the identical purpose as the ridges discussed hereabove, may have a diameter approximating .005″, may be of any deired cross-sectional configuration, and are spaced apart from center to center approximately .062″.

It has been found in practice that criticality of sealing temperatures becomes minimized with novel sealing elements constructed in accordance with the present invention. Further, continuous or unbroken seals in one direction, extending longitudinally of the sealed area, or in parallel relationship with respect to the overlying edges of thermoplastic sheet material, provide superior resistance to moisture penetration.

Moreover, polyethylene and polypropylene material may be sealed readily, with bare metal being used as the conductor of heat and pressure and without any necessity for protective coatings on the contacting surfaces. Multiple layers of polypropylene may be sealed, as well as polyethylene, without any burning through of the layer in actual contact with the sealer; oriented and non-oriented polypropylene may be sealed, so to with non-oriented polypropylene to polyethylene.

It will be obvious to those skilled in this art that various changes may be made in the invention without departing from the spirit and scope thereof and therefore the invention is not considered limited by that which is shown in the drawings and described in the specification and reference therefore is had to the claims for summaries of the essential features of the invention and novel features of construction and novel combinations of parts for all of which protection is desired.

What is claimed is:

1. A thermosealing device for providing a multiline seal through a plurality of layers of thermoplastic sheet material without the application of pressure, said device including a sealing surface constituted by a plurality of longitudinally extending and closely spaced ridges, each of said ridges including a substantially flat sealing surface of sharply reduced width, the longitudinal sides of said ridges being outwardly inclined and the bases of adjacent ridges being spaced apart a distance substantially greater than the width of each of said substantially flat sealing surfaces.

2. A thermosealing device as set forth in claim 1 where the spacing of said ridges is on the order of 1/16" from center to center and the width of each of said sealing surfaces is on the order of .005".

3. A thermosealing device as set forth in claim 2 where the height of each ridge is on the order of .082" and the longitudinal sides of said ridges are outwardly inclined, the included angle between the sides of adjacent ridges being on the order of 30° and the bases of adjacent ridges being spaced apart substantially .020".

4. A thermosealing device as set forth in claim 1 where each sealing surface is transversely arcuate.

5. In a package sealing device for producing a multi-line seal through a plurality of layers of thermoplastic sheet material without application of pressure, a removable cap providing a sealing surface, said cap being of arcuate transverse configuration and including a plurality of longitudinally extending and closely spaced ridges, each of said ridges including a flat sealing surface of sharply reduced width, the longitudinal sides of said ridges being outwardly inclined and the included angle between the sides of adjacent ridges being on the order of 30°, and the bases of adjacent ridges being spaced apart a distance substantially greater than the width of each of said flat sealing surfaces.

References Cited by the Examiner

UNITED STATES PATENTS

| | | | |
|---|---|---|---|
| 1,009,456 | 11/1911 | Wickel | 156—582 |
| 2,103,945 | 12/1937 | Henley | 156—581 |
| 2,262,493 | 11/1941 | Guinzburg | 156—582 |
| 2,369,362 | 2/1945 | Marziani | 156—583 |
| 2,390,550 | 12/1945 | Moore | 156—583 |
| 2,496,609 | 2/1950 | Van Antwerpen | 156—581 |
| 2,610,137 | 9/1952 | Williamson et al. | 156—581 |
| 3,015,601 | 1/1962 | Fener | 156—583 |

EARL M. BERGERT, *Primary Examiner.*

D. J. DRUMMOND, *Assistant Examiner.*